United States Patent [19]

Samakaev et al.

[11] Patent Number: 4,551,262

[45] Date of Patent: Nov. 5, 1985

[54] COMPOSITION FOR PREVENTING DEPOSITION OF INORGANIC SALTS

[76] Inventors: Rafail K. Samakaev, ulitsa Chkalova, 28, kv. 70, Orenburg; Alexandr I. Paguba, mikroraion 4, 55, kv. 96; Nikolai V. Smolnikov, mikroraion 2, 73, kv. 15, both of Shevchenko; Leonid T. Dytjuk, ultisa Narodnaya, 13, kv. 51, Orenburg; Vladimir I. Gusev, ulitsa Ulyanovykh, 57/2, kv. 20, Kazan; Nina M. Dyatlova, 2-oi Samotechny pereulok, 4, korpus 1, kv. 4; Galina F. Yaroshenko, ulitsa Udal t sova, 14, kv. 120, both of Moscow; Anatoly V. Barsukov, ulitsa Orenburgskaya, 88, Orenburg; Ljudmila V. Krinitskaya, ulitsa Scherbakovskaya, 7, kv. 74; Taisia M. Balashova, 15-ya Parkovaya, 42, korpus 3, kv. 49, both of Moscow, all of U.S.S.R.

[21] Appl. No.: 539,324

[22] Filed: Oct. 5, 1983

[51] Int. Cl.$^4$ .............................................. C02F 5/10
[52] U.S. Cl. ............................ 252/181; 166/279; 210/699; 210/700
[58] Field of Search .................. 252/181; 166/279; 210/699, 700

[56] References Cited

U.S. PATENT DOCUMENTS

| | | | |
|---|---|---|---|
| 3,432,553 | 3/1969 | Enders et al. | 260/585 |
| 3,467,192 | 9/1969 | Nolan, III et al. | 166/279 |
| 3,483,925 | 12/1969 | Slyker | 166/279 |
| 3,778,377 | 12/1973 | Clark | 252/181 |
| 4,051,110 | 9/1977 | Quinlan | 210/700 |

FOREIGN PATENT DOCUMENTS 789434 12/1980 U.S.S.R. .
834334 6/1981 U.S.S.R. .
876666 10/1981 U.S.S.R. .

Primary Examiner—Paul Lieberman
Assistant Examiner—Robert A. Wax
Attorney, Agent, or Firm—Lester Horwitz

[57] ABSTRACT

The present invention relates to a composition for preventing deposition of inorganic salts. The composition incorporates 0.1-4.5% by weight and 1,3-diaminopropanol-2 and/or of a derivative of 1,3-diaminopropanol-2 of the general formula:

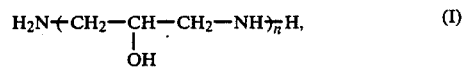

wherein n=2 to 20, 5.0–50.0% by weight of a phosphonomethylated derivative of 1,3-diaminopropanol-2 in the form of a salt of an alkali metal and/or ammonium salt of the general formula:

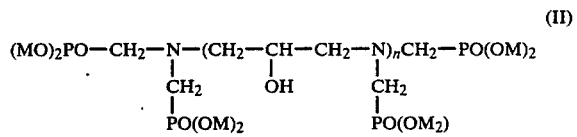

wherein n=1 to 20, M is an alkali metal or NH$_4$, 3.0–12.0% by weight of an alkali metal chloride, ammonium chloride or a mixture of both and water to 100%. The composition effectively prevents scaling of inorganic salts, e.g. barium sulphate, calcium sulphate and calcium carbonate.

1 Claim, No Drawings

COMPOSITION FOR PREVENTING DEPOSITION OF INORGANIC SALTS

FIELD OF THE INVENTION

The present invention relates to compositions for preventing deposition of inorganic salts and can be useful in systems of return water supply, distillers for mineralized waters, as well as in processes of oil and natural gas extraction, transportation and preconditioning.

BACKGROUND OF THE INVENTION

Known in the art is a composition for preventing deposition of inorganic salts comprising aminomethylenephosphonic acids, for example nitrilotrimethylenephosphonic acid of the general formula:

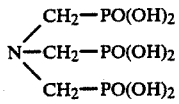

and surfactant additives, for example a compound of the general formula:

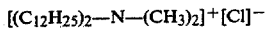

(cf. U.S. Pat. No. 3,467,192 Cl. 166–279; 1968).

Also known is a composition for preventing deposition of inorganic salts incorporating a polyethylenepolyamine-N-methylenephosphonic acid of the general formula:

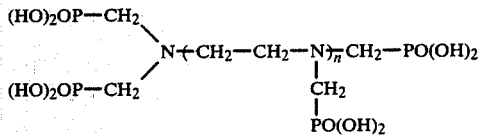

wherein n=0 to 14, and polyacrylamide (cf. U.S. Pat. No. 3,483,925 Cl. 166–279; 1968).

Also known is a process for preventing deposition of inorganic salts which is based on the use of an aqueous solution of a phosphonomethylated derivative of 1,3-diaminopropanol-2 in the acidic form corresponding to the general formula:

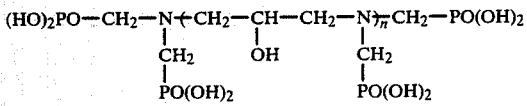

(cf. USSR Inventor's Certificate No. 789434, Int. Cl.$^3$E 21 B 43/12; 1980).

However, these compositions for preventing scaling of inorganic salts are insufficiently effective against deposition of barium sulphate. Furthermore, the use of polyacrylamide causes certain difficulties in the preparation of working solutions of a required concentration. Thus, this necessitates the use of high-speed mixers with cutting blades which inevitably results in non-productive consumption of labour and power.

The prior art composition most resembling that of the present invention in the subject matter and result obtained is a composition for preventing deposition of inorganic salts which comprises a phosphonomethylated derivative of 1,3-diaminopropanol-2 in the acid form corresponding to the following general formula:

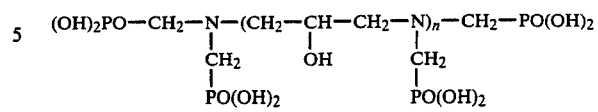

wherein n=1 to 5, and 1,3-diaminopropanol-2 and/or a derivative of 1.3-diaminopropanol-2 of the general formula:

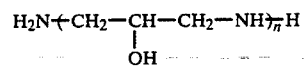

wherein n=1 to 5, hydrochloric acid, an alkali metal chloride and water, the components being present in the composition in the following proportions, percent by weight:

| | |
|---|---|
| phosphonomethylated derivative of 1.3-diaminopropanol-2 in the acid form | 5.0–20.0 |
| 1,3-diaminopropanol-2 and/or 1,3-diaminopropanol-2 derivative | 5.0–7.0 |
| hydrochloric acid | 3.0–30.0 |
| alkali metal chloride | 3.0–7.0 |
| water | the balance. |

(cf. USSR Inventor's Certificate No. 834334, Int. Cl.$^3$ E 21 B 43/00; 1981).

This composition, however, is insufficiently effective against deposition of barium sulphate.

Thus, when the known composition for preventing deposition of inorganic salts according to the USSR Inventor's Certificate No. 834334 is used in the amount of 100 mg/l, at lower limits of concentrations of the composition components the protective effect against deposition of barium sulphate is only 8.9%, while at upper limits of concentrations of the components it is equal to 36.3%.

SUMMARY OF THE INVENTION

It is an object of the present invention to provide such a composition for preventing deposition of inorganic salts which would possess an improved protective effect against deposition of barium sulphate while retaining similar protective properties against deposition of other inorganic salts such as calcium sulphate and calcium carbonate.

These and other objects of the present invention are accomplished by the provision of a composition for preventing deposition of inorganic salts comprising a phosphonomethylated derivative of 1,3-diaminopropanol-2, and 1,3-diaminopropanol-2 and/or a derivative of 1,3-diaminopropanol-2 of the general formula:

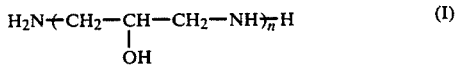

wherein n=2 to 20, and alkali metal chloride, ammonium chloride or a mixture thereof, water, wherein according to the present invention the phosphonomethylated derivative of 1,3-diaminopropanol-2 is present in the form of a salt of an alkali metal and/or an ammonium salt corresponding to the general formula:

| | |
|---|---|
| 1,3-diaminopropanol-2 and/or derivative of 1,3-diaminopropanol-2 of the general formula (I) | 0.1–4.5 |
| phosphonomethylated derivative of 1,3-diaminopropanol-2 of the general formula (II) | 5.0–50.0 |
| alkali metal chloride, ammonium chloride, or a mixture of both | 3.0–12.0 |
| water | the balance. | wherein n=1 to 20, M is an alkali metal, $NH_4$; the components being employed in the following proportions, percent by weight:

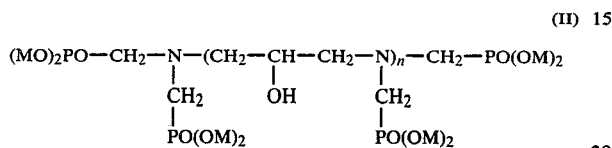

(II)

The composition according to the present invention provides a high protective effect against deposition of barium sulphate. Thus, at low limits of concentration of the components of the composition the protective effect is 58.3%, while at lower limits it is as high as 100%. Furthermore, the composition according to the present invention ensures a high protective effect against deposition of other inorganic salts such as calcium sulphate and calcium carbonate. Thus, at lower limits of concentrations of the components of the composition the protective effect against deposition of calcium sulphate is 62.6%, that against deposition of calcium carbonate is 60.6%. At upper limits of concentrations of the components of the composition the protective effect against deposition of calcium sulphate and calcium carbonate is 100%.

The reduction of the lower limits of concentrations of the components of the composition according to the present invention is inadvisable, since a sharp decrease of the protective effect against deposition of barium sulphate is observed. The increase in upper limits of concentrations of the components of the composition according to the present invention is also inexpedient, since within the claimed range of upper limits the composition ensures a 100% protective effect.

DETAILED DESCRIPTION OF THE INVENTION

The composition for preventing deposition of inorganic salts according to the present invention is prepared in a conventional manner by dissolving, in water, and 1,3-diaminopropanol-2 and/or a derivative of 1,3-diaminopropnal-2 of the general formula (I), a phosphonomethylated derivative of 1,3-diaminopropanol-2 of the general formula (II) and an alkali metal chloride, ammonium chloride or a mixture of both. The ratio between the alkali metal chloride and ammonium chloride in the mixture can be different at a total content thereof in the composition according to the present invention within the above-specified range. The phosphonomethylated derivative of 1,3-diaminopropanol-2 of the general formula (II) can be used as an individual salt (a salt of an alkali metal or an ammonium salt) and as a mixture of said salts. The ratio of the salts in a mixture can be also different at a total content thereof in the composition according to the present invention within the above-specified range.

1,3-diaminopropanol-2 and/or the derivative of 1,3-diaminopropanol-2 of the general formula (I) employed in the composition for preventing deposition of inorganic salts according to the present invention is prepared by reacting epichlorohydrin with an excess of ammonia employed as an aqueous solution at a temperature of 10° to 30° C. for a period of from ¼ to 6 hours, followed by neutralization of the evolved hydrogen chloride with an aqueous solution of an alkali, the removal of the unreacted ammonia and vacuum fractionation of the reaction mass (cf. U.S. Pat. No. 3,432,553 Cl. 260–585).

The phosphonomethylated derivative of 1,3-diamonopropanol-2 in the salt form corresponding to the general formula (II) employed in the composition for preventing deposition of inorganic salts according to the present invention is prepared in the following manner. First, effected is the reaction of 1,3-diaminopropanol-2 and/or the derivative of 1,3-diaminopropanol-2 of the general formula (I) with formaldehyde and phosphorus trichloride, followed by precipitation of the phosphonomethylated derivative of 1,3-diaminopropanol-2 in the acid form from the reaction mass by methanol (cf. USSR Inventor's Certificate No. 876666, Int.Cl.[3] C 08 G 79/04, C 08 J 5/20; 1981). The conversion from the acid form into the salt one can be effected by treatment of the acid form with an aqueous solution of an alkali such as sodium hydroxide, potassium hydroxide or gaseous ammonia.

The composition according to the present invention can be used in systems of the return water supply, distillers for mineralized waters, as well as in processes of oil and natural gas extraction, transportation and preconditioning.

For example, during exploitation of oil fields several modes of injection of the composition according to the present invention (scale inhibitor) into producing oil wells are possible:

1. Continuous dispensing of the composition into the annular space of the producing oil well by means of a metering device.
2. Continuous dispensing of the composition into the system of maintaining formation pressure through a pumping well.
3. Periodic pumping of the composition into the producing formation through the producing oil well. This mode of utilization of the composition for preventing scale deposition is based on the ability of the composition to get adsorbed on a porous surface of the critical zone of the well and be slowly washed, during exploitation of the well by known methods, by mineralized waters, thus inhibiting deposition of inorganic salts in the well and well equipment for several months.
4. Continuous dispensing of the composition by means of a metering device to the inlet of the heat-exchanging equipment of the unit of a thermochemical field preconditioning of crude oil.

The composition according to the present invention has been tested for the protective effect against deposition of such inorganic salts as barium sulphate, calcium carbonate and calcium sulphate.

The assessment of the protective effect of the composition according to the present invention and that of the USSR Inventor's Certificate No. 834334 against deposition of barium sulphate was carried out according to the following procedure.

An aqueous solution oversaturated in respect of barium sulphate is prepared by mixing two solutions I and II. The salt composition of these solutions is shown in Table 1 hereinbelow.

TABLE 1

| Content of salts, mg/l | | | |
|---|---|---|---|
| Solution I | | Solution II | |
| BaCl$_2$.6H$_2$O | NaCl | Na$_2$SO$_4$ | NaCl |
| 560 | 30.000 | 800 | 30.000 |

The tests were conducted at the temperature of 80° C. under continuous stirring of the oversaturated aqueous solution. The duration of the experiments was 8 hours. The protective effect against deposition of barium sulphate was determined by the weight method according to the formula:

$$E = \left(1 - \frac{P}{P_o}\right) \cdot 100, \text{ wherein:}$$

E-protective effect, %;
P-weight of the precipitated barium sulphate after the addition of the composition, g;
$P_o$-weight of the precipitated barium sulphate without the addition of the composition, g.

Table 2 shows particular formulations of the composition according to the present invention and that known from the USSR Inventor's Certificate No. 834334, as well as the values of the protective effects against deposition of barium sulphate. In this case is used a mixture of the 1,3-diaminopropanol-2 (n=1) and wherein n=5 and 20, at the following proportions of the above-mentioned products, percent by weight:

| n = 1 | 80 |
|---|---|
| n = 5 | 15 |
| n = 20 | 5. |

As the phosphonomethylated derivative of 1,3-diaminopropanol-2 of the general formula (II) use is also made of a mixture of products with a different degree of polymerization (n=1, n=5, n=20) at the above-mentioned amounts of the products in the mixture. In each case the above-specified derivative is used in the form of an individual salt (an alkali metal salt or an ammonium salt).

From the data given in the foregoing Table 2 it is seen that the composition according to the present invention is considerably superior, in its efficiency, over the known composition according to the USSR Inventor's Certificate No. 834334.

Thus, in the prior art composition the protective effect at lower limits of concentrations of the components

TABLE 2

| | | | Components of the composition, wt percent | | | | | |
|---|---|---|---|---|---|---|---|---|
| No. | Composition | Composition concentration, mg/l | Phosphonomethylated derivative of 1,3-diaminopropanol-2 in acid form | Phosphonomethylated derivative of 1,3-diaminopropanol-2 in salt form of the general formula (II) | Hydrochloric acid | Alkali metal or ammonium chloride | Water | Protective effect |
| 1 | 2 | 3 | 4 | 5 | 6 | 7 | 8 | 9 | 10 |
| 1 | Known composition of the USSR inventor's Certificate No. 834334 | 100 | 5.0 | — | 5.0 | 3.0 | 3.0 to 100 | 8.9 |
| 2 | | 100 | 10.0 | — | 5.5 | 10.0 | 4.5 to 100 | 15.9 |
| 3 | | 100 | 15.0 | — | 6.0 | 20.0 | 5.5 to 100 | 24.4 |
| 4 | | 100 | 20.0 | — | 7.0 | 30.0 | 7.0 to 100 | 36.3 |
| 5 | | 25 | 15.0 | — | 6.0 | 20.0 | 5.5 to 100 | 6.6 |
| 6 | | 50 | 15.0 | — | 6.0 | 20.0 | 5.5 to 100 | 18.8 |
| 7 | | 100 | 15.0 | — | 6.0 | 20.0 | 5.5 to 100 | 24.4 |
| 8 | | 150 | 15.0 | — | 6.0 | 20.0 | 5.5 to 100 | 37.1 |
| 9 | | 200 | 15.0 | — | 6.0 | 20.0 | 5.5 to 100 | 44.5 |
| | | | | Sodium salt | | | Sodium chloride | |
| 10 | | 100 | — | 5.0 | 0.1 | — | 3.0 to 100 | 58.3 |
| 11 | | 100 | — | 10.0 | 0.5 | — | 5.0 to 100 | 62.2 |
| 12 | Composition of the invention | 100 | — | 20.0 | 1.5 | — | 7.0 to 100 | 89.3 |
| 13 | | 100 | — | 30.0 | 2.5 | — | 9.0 to 100 | 92.9 |
| 14 | | 100 | — | 40.0 | 4.0 | — | 10.0 to 100 | 98.3 |
| 15 | | 100 | — | 50.0 | 4.5 | — | 12.0 to 100 | 100.0 |
| 16 | | 25 | — | 30.0 | 2.5 | — | 9.0 to 100 | 60.0 |
| 17 | | 50 | — | 30.0 | 2.5 | — | 9.0 to 100 | 75.5 |
| 18 | | 150 | — | 30.0 | 2.5 | — | 9.0 to 100 | 100.0 |
| 19 | | 200 | — | 30.0 | 2.5 | — | 9.0 to 100 | 100.0 |
| | | | | Potassium salt | | Sodium chloride | | |
| 20 | | 100 | — | 5.0 | 0.1 | — | 3.0 to 100 | 60.0 |
| 21 | | 100 | — | 10.0 | 0.5 | — | 5.0 to 100 | 62.8 |
| 22 | | 100 | — | 20.0 | 1.5 | — | 7.0 to 100 | 90.2 |
| 23 | | 100 | — | 30.0 | 2.5 | — | 9.0 to 100 | 94.5 |
| 24 | | 100 | — | 40.0 | 4.0 | — | 10.0 to 100 | 98.0 |
| 25 | | 100 | — | 50.0 | 4.5 | — | 12.0 to 100 | 100.0 |
| 26 | | 25 | — | 30.0 | 2.5 | — | 9.0 to 100 | 62.3 |
| 27 | | 50 | — | 30.0 | 2.5 | — | 9.0 to 100 | 73.5 |
| 28 | | 150 | — | Ammonium salt 30.0 | 2.5 | — | 9.0 to 100 | 100.0 |
| 29 | Composition of this invention | 200 | — | 30.0 | 2.5 | — | 9.0 to 100 Ammonium chloride | 100.0 |
| 30 | | 100 | — | 5.0 | 0.1 | — | 3.0 to 100 | 59.9 |
| 31 | | 100 | — | 10.0 | 0.5 | — | 5.0 to 100 | 62.0 |

TABLE 2-continued

| | | | Components of the composition, wt percent | | | | | |
|---|---|---|---|---|---|---|---|---|
| No. | Composition | Composition concentration, mg/l | Phosphonomethylated derivative of 1,3-diaminopropanol-2 in acid form | Phosphonomethylated methylated derivative of 1,3-diaminopropanol-2 in salt form of the general formula (II) | Hydrochloric acid | Alkali metal or ammonium chloride | Water | Protective effect |
| 1 | 2 | 3 | 4 | 5 | 6 | 7 | 8 | 9 | 10 |
| 32 | | 100 | — | 20.0 | 1.5 | — | 7.0 | to 100 | 90.3 |
| 33 | | 100 | — | 30.0 | 2.5 | — | 9.0 | to 100 | 95.0 |
| 34 | | 100 | — | 40.0 | 4.0 | — | 10.0 | to 100 | 99.3 |
| 35 | | 100 | — | 50.0 | 4.5 | — | 12.0 | to 100 | 100.0 |
| 36 | | 25 | — | 30.0 | 2.5 | — | 9.0 | to 100 | 63.4 |
| 37 | | 50 | — | 30.0 | 2.5 | — | 9.0 | to 100 | 76.6 |
| 38 | | 150 | — | 30.0 | 2.5 | — | 9.0 | to 100 | 100.0 |
| 39 | | 200 | — | 30.0 | 2.6 | — | 9.0 | to 100 | 100.0 |
| | | | | Sodium salt | | | Sodium chloride | | |
| 40 | Comparison | 100 | — | 2.5 | 0.05 | — | 2.0 | to 100 | 38.8 |
| 41 | composition | 100 | — | 60.0 | 5.0 | — | 15.0 | to 100 | 100.0 |
| | | | | Potassium salt | | | Potassium chloride | | |
| 42 | | 100 | — | 2.5 | 0.05 | — | 2.0 | to 100 | 38.9 |
| 43 | Comparison composition | 100 | — | 60.0 | 5.0 | — | 15.0 | to 100 | 100.0 |
| | | | | Ammonium salt | | | Ammonium chloride | | |
| 44 | | 100 | — | 2.5 | 0.05 | — | 2.0 | to 100 | 40.1 |
| 45 | | 100 | — | 60.0 | 5.0 | — | 15.0 | to 100 | 100.0 | is only 8.9%, whereas the composition according to the present invention ensures protective effect of 58.3%. A similar result is obtained in respect of the protective effect at upper limits of concentrations of the components of both compositions. Thus, in the prior art composition the protective effect is only 36.3%, whereas in the case of using the composition of the present invention the protective effect is 100.0%.

Table 3 shows particular formulations of the composition according to the present invention and values of the protective effect against deposition of barium sulphate. 1,3-diaminopropanol-2 and the derivative of 1,3-diaminopropanol-2 of the general formula (I) and the phosphonomethylated derivative of 1,3-diaminopropanol-2 in the salt form of the general formula (II) are shown as individual compounds.

The procedure for evaluation of the protective effect is similar to that described hereinbefore. In all of the experiments and amount of the composition introduced into an oversaturated solution of barium sulphate is 100 mg/l.

From the data shown in Table 3 it is seen that the composition according to the present invention has a high protective effect against deposition of barium sulphate.

The assessment of efficiency of the composition according to the present invention and that according to the USSR Inventor's Certificate No. 834334 in respect of

TABLE 3

| | Components of the composition percent by weight | | | | | | |
|---|---|---|---|---|---|---|---|
| No. | Phosphonomethylated derivative of 1,3-diaminopropanol-2 in the salt form of the general formula (II) | 1,3-diaminopropanol-2 or derivative of 1,3-diaminopropanol-2 of the general formula (I) | Sodium chloride | Potassium chloride | Ammonium chloride | Water | Protective effect % |
| 1 | 2 | 3 | 4 | 5 | 6 | 7 | 8 |
| | Sodium salt | | | | | | |
| | n = 1 | n = 1 | | | | | |
| 1 | 30.0 | 2.5 | 9.0 | — | — | to 100 | 92.9 |
| 2 | 30.0 | 2.5 | — | 9.0 | — | to 100 | 93.0 |
| 3 | 30.0 | 2.5 | — | — | 9.0 | to 100 | 93.0 |
| 4 | 30.0 | 2.5 | 3.0 | — | 6.0 | to 100 | 92.7 |
| | n = 5 | n = 5 | | | | | |
| 5 | 5.0 | 0.1 | 3.0 | — | — | to 100 | 58.3 |
| 6 | 10.0 | 0.5 | — | 5.0 | — | to 100 | 62.8 |
| 7 | 20.0 | 1.5 | — | — | 7.0 | to 100 | 90.0 |
| 8 | 30.0 | 2.5 | 4.5 | — | 4.5 | to 100 | 93.2 |
| 9 | 40.0 | 4.0 | — | 2.5 | 7.5 | to 100 | 98.0 |
| 10 | 50.0 | 4.5 | 4.0 | 4.0 | 4.0 | to 100 | 100.0 |
| | n = 20 | n = 20 | | | | | |
| 11 | 5.0 | 0.1 | 3.0 | — | — | to 100 | 90.3 |
| 12 | 30.0 | 2.5 | — | 9.0 | — | to 100 | 91.4 |
| 13 | 50.0 | 4.5 | — | — | 12.0 | to 100 | 100.0 |
| | Potassium salt | | | | | | |
| | n = 1 | n = 1 | | | | | |
| 14 | 5.0 | 0.1 | 3.0 | — | — | to 100 | 60.0 |
| 15 | 30.0 | 2.5 | — | 9.0 | — | to 100 | 95.3 |
| 16 | 50.0 | 4.5 | — | — | 12.0 | to 100 | 100.0 |
| | n = 5 | n = 5 | | | | | |

TABLE 3-continued

| | Components of the composition percent by weight | | | | | | |
|---|---|---|---|---|---|---|---|
| No. 1 | Phosphonomethylated derivative of 1,3-diaminopropanol-2 in the salt form of the general formula (II) 2 | 1,3-diaminopropanol-2 or derivative of 1,3-diaminopropanol-2 of the general formula (I) 3 | Sodium chloride 4 | Potassium chloride 5 | Ammonium chloride 6 | Water 7 | Protective effect % 8 |
| 17 | 5.0 | 0.1 | — | 1.5 | 1.5 | to 100 | 61.3 |
| 18 | 30.0 | 2.5 | 4.0 | — | 5.0 | to 100 | 96.0 |
| 19 | 50.0 | 4.5 | 6.0 | 6.0 | — | to 100 | 100.0 |
| | n = 20 | n = 20 | | | | | |
| 20 | 5.0 | 0.1 | 1.0 | 1.0 | 1.0 | to 100 | 57.9 |
| 21 | 30.0 | 2.5 | 3.0 | 3.0 | 3.0 | to 100 | 93.0 |
| 22 | 50.0 | 4.5 | 4.0 | 4.0 | 4.0 | to 100 | 100.0 |
| | Ammonium salt | | | | | | |
| | n = 1 | n = 1 | | | | | |
| 23 | 30.0 | 2.5 | — | — | 3.0 | to 100 | 96.6 |
| 24 | 30.0 | 2.5 | 4.0 | — | 5.0 | to 100 | 95.9 |
| | n = 20 | n = 20 | | | | | |
| 25 | 30.0 | 2.5 | 2.0 | — | 10.0 | to 100 | 93.7 | inhibition of deposition of calcium sulphate and calcium carbonate was effected according to the following procedure.

A solution oversaturated with respect to calcium sulphate is prepared by mixing in water equivalent amounts of calcium chloride and sodium sulphate whereas a solution oversaturated with respect to calcium carbonate is prepared by mixing the equivalent quantity of calcium chloride and sodium carbonate. The initial concentration of calcium sulphate and calcium carbonate in the oversaturated solution is 7.0 g/l.

In all of the experiments the amount of the composition introduced into the oversaturated solution is 20 mg/l. The oversaturated aqueous solutions are thermostatted at the temperature of 40° C. The protective effect is determined 240 hours afterwards according to the following formula:

$$E = \frac{C_i - C_k}{C_o - C_k} \cdot 100, \text{ wherein:}$$

E-protective effect, %;
$C_o$-initial concentration of calcium ions in the oversaturated solution of calcium sulphate or calcium carbonate, g/l;
$C_k$-concentration of calcium ions in the oversaturated solution of calcium sulphate or calcium carbonate without the addition of the composition, g/l;
$C_i$-concentration of calcium ions in the oversaturated solution of calcium sulphate or calcium carbonate after the addition of the composition, g/l.

TABLE 4

| | | Components of the composition percent by weight | | | | Protective effect, % | | | |
|---|---|---|---|---|---|---|---|---|---|
| No. 1 | Composition 2 | Phosphonomethylated derivative of 1,3-diaminopropanol-2 in the acid form 3 | Sodium salt of phosphonomethylated derivative of 1,3-diaminopropanol-2 of the general formula (II) 4 | Mixture of 1,3-diaminopropanol-2 and derivative of 1,3-diaminopropanol-2 of the general formula (I) 5 | Hydrochloric acid 6 | Sodium chloride 7 | Water 8 | against deposition of calcium sulphate 9 | calcium carbonate 10 |
| 1 | Known composition according to the USSR Inventor's Certificate No. 834334 | 5.0 | — | 5.0 | 3.0 | 3.0 | to 100 | 58.3 | 52.3 |
| 2 | | 7.5 | — | 5.5 | 10.0 | 4.0 | to 100 | 64.2 | 61.6 |
| 3 | | 10.0 | — | 6.0 | 18.0 | 5.0 | to 100 | 77.8 | 70.4 |
| 4 | | 15.0 | — | 6.5 | 24.0 | 6.0 | to 100 | 93.5 | 89.2 |
| 5 | | 20.0 | — | 7.0 | 30.0 | 7.0 | to 100 | 98.5 | 93.2 |
| 6 | Composition of this invention | — | 5.0 | 0.1 | — | 3.0 | to 100 | 62.6 | 60.6 |
| 7 | | — | 10.0 | 0.5 | — | 5.0 | to 100 | 82.1 | 77.2 |
| 8 | | — | 20.0 | 1.5 | — | 7.0 | to 100 | 99.3 | 97.2 |
| 9 | | — | 30.0 | 2.5 | — | 9.0 | to 100 | 100.0 | 100.0 |
| 10 | | — | 40.0 | 4.0 | — | 10.0 | to 100 | 100.0 | 100.0 |
| 11 | | — | 50.0 | 4.5 | — | 12.0 | to 100 | 100.0 | 100.0 |

Shown in Table 4 are particular formulations of the composition according to the present invention and that of the USSR Inventor's Certificate No. 834334 and values of the protective effect against deposition of calcium sulphate and calcium carbonate. In this case is used a mixture of 1,3-diaminopropanol-2 (n=1) and a derivative of 1,3-diaminopropanol-2 having the general formula wherein n=5 and 20 at the following proportions of these products, percent by weight:

| | |
|---|---|
| n = 1 | 80 |
| n = 5 | 15 |
| n = 20 | 5. |

As the phosphonomethylated derivative of 1,3-diaminopropanol-2 of the general formula (II), wherein M is Na, a mixture of products with a different degree of polymerization is also used (n=1, n=5, n=20) at the same proportions of the products in the mixture as those shown hereinabove.

From the data shown in the above Table 4 it follows that the composition according to the present invention effectively prevents deposition of calcium sulphate and calcium carbonate from oversaturated solutions thereof.

Table 5 gives particular formulations of the composition according to the present invention and the values of the protective effect against deposition of barium sulphate. In this case is used a mixture of 1,3-diaminopropanol-2 (n=1) and the derivative of 1,3-diaminopropanol-2 of the general formula (I), wherein n=5 and 20, at the following proportions of these products, percent by weight:

| n = 1 | 80 |
|---|---|
| n = 5 | 15 |
| n = 20 | 5. |

As the phosphonomethylated derivative of 1,3-diaminopropanol-2 of the general formula (II) a mixture of products with a different degree of polymerization (n=1, n=5, n=20) is used at the above-mentioned proportions of the products in a mixture. In each case this derivative is used as a mixture of different salts.

From the data shown in Table 5 it follows that the composition according to the present invention effectively prevents deposition of barium sulphate from oversaturated solutions thereof.

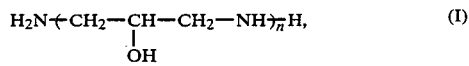

$$H_2N \text{+} CH_2-\underset{OH}{CH}-CH_2-NH \text{+}_n H, \quad (I)$$

wherein n=2 to 20;

and the mixture of said amines, phosphonomethylated derivative of 1,3-diaminopropanol-2 in the form of a salt selected from the group consisting of a salt of an alkali metal, an ammonium salt and a mixture of said salts of the general formula:

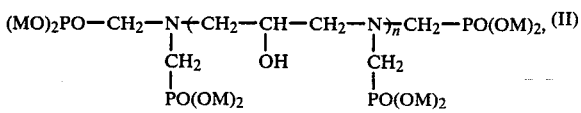

wherein n=1 to 20, M is an alkali metal, $NH_4$;

chlorides selected from the group consisting of an alkali metal chloride, ammonium chloride and a mixture thereof;

water;

the components being present in the following proportions, percent by weight:

| amines selected from group consisting of 1,3-diaminopropanol-2 | 0.1–4.5 |
|---|---|

TABLE 5

| No. | Phosphonomethylated derivative of 1,3-diaminopropanol-2 in the form of a mixture of salts of the general formula (II) ||| Mixture of 1,3-diaminopropanol-2 and derivative of 1.3-diaminopropanol-2 of the general formula (1) | Sodium chloride | Potassium chloride | Ammonium chloride | Water | Protective effect, % |
|---|---|---|---|---|---|---|---|---|---|
|  | Sodium salt | Potassium salt | Ammonium salt |  |  |  |  |  |  |
| 1 | 2 | 3 | 4 | 5 | 6 | 7 | 8 | 9 | 10 |
| 1 | 20.0 | — | 10.0 | 2.5 | 6.0 | — | 3.0 | to 100 | 92.3 |
| 2 | 20.0 | 10.0 | — | 2.5 | 6.0 | 3.0 | — | to 100 | 92.5 |
| 3 | — | 20.0 | 10.0 | 2.5 | — | 6.0 | 3.0 | to 100 | 92.7 |
| 4 | 10.0 | 10.0 | 10.0 | 2.5 | 3.0 | 3.0 | 3.0 | to 100 | 92.4 |
| 5 | 3.0 | — | 2.0 | 0.1 | 2.0 | — | 1.0 | to 100 | 58.0 |
| 6 | — | 3.0 | 2.0 | 0.1 | — | 2.0 | 1.0 | to 100 | 58.7 |
| 7 | 3.0 | 1.0 | 1.0 | 0.1 | 1.0 | 1.0 | 1.0 | to 100 | 58.8 |
| 8 | 3.0 | 2.0 | — | 0.1 | 2.0 | 1.0 | — | to 100 | 58.4 |
| 9 | 30.0 | — | 20.0 | 4.5 | 8.0 | — | 4.0 | to 100 | 100.0 |
| 10 | — | 30.0 | 20.0 | 4.5 | — | 8.0 | 4.0 | to 100 | 100.0 |
| 11 | 30.0 | 10.0 | 10.0 | 4.5 | 6.0 | 3.0 | 3.0 | to 100 | 100.0 |
| 12 | 30.0 | 20.0 | — | 4.5 | 8.0 | 4.0 | — | to 100 | 100.0 |

What is claimed is:

1. A composition for preventing deposition of inorganic salts comprising:

amines selected from group consisting of 1,3-diaminopropanol-2 a derivative of 1,3-diaminopropanol-2 of the general formula:

| derivative of 1.3-diaminopropanol-2 of the general formula (I) phosphonomethylated derivative of 1,3-diaminopropanol-2 of the general formula (II) | 5.0–50.0 |
|---|---|
| chlorides | 3.0–12.0 |
| water | to 100%. |

* * * * *